United States Patent
Schwarz et al.

(10) Patent No.: US 9,816,442 B2
(45) Date of Patent: *Nov. 14, 2017

(54) GAS TURBINE ENGINE WITH HIGH SPEED LOW PRESSURE TURBINE SECTION

(71) Applicant: United Technologies Corporation, Hartford, CT (US)

(72) Inventors: Frederick M. Schwarz, Glastonbury, CT (US); Gabriel L. Suciu, Glastonbury, CT (US); Daniel Bernard Kupratis, Wallingford, CT (US); William K. Ackermann, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 118 days.

This patent is subject to a terminal disclaimer.

(21) Appl. No.: 14/573,003

(22) Filed: Dec. 17, 2014

(65) Prior Publication Data

US 2015/0096303 A1 Apr. 9, 2015

Related U.S. Application Data

(63) Continuation-in-part of application No. 13/363,154, filed on Jan. 31, 2012, now abandoned.

(51) Int. Cl.
| | |
|---|---|
| *F02C 7/36* | (2006.01) |
| *F02K 3/04* | (2006.01) |
| *F02C 3/04* | (2006.01) |
| *F02K 3/06* | (2006.01) |
| *F02C 3/107* | (2006.01) |

(52) U.S. Cl.
CPC ............... *F02C 7/36* (2013.01); *F02C 3/04* (2013.01); *F02C 3/107* (2013.01); *F02K 3/04* (2013.01); *F02K 3/06* (2013.01)

(58) Field of Classification Search
CPC .... F02C 7/36; F02C 3/04; F02C 3/107; F02K 3/04; F02K 3/06
See application file for complete search history.

(56) References Cited

U.S. PATENT DOCUMENTS

| | | |
|---|---|---|
| 2,936,655 A | 5/1960 | Peterson et al. |
| 3,021,731 A | 2/1962 | Stoeckicht |
| (Continued) | | |

FOREIGN PATENT DOCUMENTS

| | | |
|---|---|---|
| EP | 1403500 A1 | 3/2004 |
| EP | 1577491 A1 | 9/2005 |
| (Continued) | | |

OTHER PUBLICATIONS

Supplementary European Search Report for European Application No. 13775036.0 received Dec. 2, 2015.

(Continued)

*Primary Examiner* — Steven Sutherland
(74) *Attorney, Agent, or Firm* — Carlson, Gaskey & Olds, P.C.

(57) ABSTRACT

A gas turbine engine includes a very high speed low pressure turbine such that a quantity defined by the exit area of the low pressure turbine multiplied by the square of the low pressure turbine rotational speed compared to the same parameters for the high pressure turbine is at a ratio between about 0.5 and about 1.5.

21 Claims, 2 Drawing Sheets

(56) References Cited

U.S. PATENT DOCUMENTS

| | | | |
|---|---|---|---|
| 3,033,002 | A | 5/1962 | Davis |
| 3,287,906 | A | 11/1966 | McCormick |
| 3,352,178 | A | 11/1967 | Lindgren et al. |
| 3,886,737 | A | 6/1975 | Grieb |
| 4,448,019 | A | 5/1984 | Klees |
| 4,809,498 | A | 3/1989 | Giffin, III et al. |
| 5,433,674 | A | 7/1995 | Sheridan |
| 5,915,917 | A | 6/1999 | Eveker et al. |
| 6,223,616 | B1 | 5/2001 | Sheridan |
| 6,378,308 | B1 | 4/2002 | Pfluger |
| 6,732,502 | B2 | 5/2004 | Seda et al. |
| 7,513,103 | B2 | 4/2009 | Orlando et al. |
| 7,591,754 | B2 | 9/2009 | Duong et al. |
| 7,600,370 | B2 | 10/2009 | Dawson |
| 7,694,505 | B2 | 4/2010 | Schilling |
| 8,061,969 | B2 | 11/2011 | Durocher et al. |
| 8,091,371 | B2 | 1/2012 | Durocher et al. |
| 8,834,099 | B1 | 9/2014 | Topol et al. |
| 9,540,948 | B2 * | 1/2017 | Schwarz ............... F01D 25/162 |
| 2008/0190095 | A1 | 8/2008 | Baran |
| 2009/0056306 | A1 | 3/2009 | Suciu et al. |
| 2009/0090096 | A1 | 4/2009 | Sheridan |
| 2009/0094961 | A1 * | 4/2009 | Stern ......................... F02K 1/09 |
| | | | 60/226.3 |
| 2009/0229242 | A1 | 9/2009 | Schwark |
| 2009/0266912 | A1 * | 10/2009 | Gukeisen ............... F02K 1/1253 |
| | | | 239/265.33 |
| 2010/0005778 | A1 * | 1/2010 | Chaudhry ............. F02K 1/1207 |
| | | | 60/226.3 |
| 2010/0105516 | A1 | 4/2010 | Sheridan |
| 2010/0148396 | A1 | 6/2010 | Xie et al. |
| 2010/0162683 | A1 * | 7/2010 | Grabowski ............... F02C 7/36 |
| | | | 60/226.3 |
| 2010/0331139 | A1 | 12/2010 | McCune |
| 2012/0291449 | A1 | 11/2012 | Adams |
| 2013/0223986 | A1 | 8/2013 | Kupratis et al. |
| 2013/0318998 | A1 | 12/2013 | Schwarz et al. |
| 2014/0130479 | A1 | 5/2014 | Schwarz et al. |
| 2016/0032826 | A1 | 2/2016 | Rued |

FOREIGN PATENT DOCUMENTS

| | | |
|---|---|---|
| EP | 1607574 A1 | 12/2005 |
| EP | 1777370 A2 | 4/2007 |
| EP | 2270315 A2 | 1/2011 |
| GB | 1516041 | 6/1978 |
| GB | 2041090 | 9/1980 |
| WO | 2007038674 | 4/2007 |
| WO | 2014018142 A2 | 1/2014 |

OTHER PUBLICATIONS

"The Geared Turbofan Technology—Opportunities, Challenges and Readiness Status," C. Riegler, C. Bichlmaier, MTU Aero Engines GmbH, Germany.

"Geared Fan," Dr. Gunter Wilfert, MTU Aero Engines, Germany.

"Clean—Validation of a GTF High Speed Turbine and Integration of Heat Exchanger Technology in an Environmental Friendly Engine Concept," Gunter Wilfert, et al., ISABE—2005—1156.

"Clean—Validation of a High Efficient Low NOx core, a GTF High Speed Turbine and an Integration of a Recuperator in an Environmental Friendly engine Concept," Dr. Gunter Wilfert, et al., AIAA 2005-4195, Jul. 1-13, 2005.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K, Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

(56) References Cited

OTHER PUBLICATIONS

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010.
Singapore Search Report and Written Opinion for Singapore Application No. 11201403118S dated Apr. 20, 2015.
NASA/TM 2010-216758—Assessment of Aerodynamic Challenges of a Variable-Speed Power Turbine for Large Civil Tilt-Rotor Application, Welch, Aug. 2010.
NASA/TM 2012-217605—Variable-Speed-Power-Turbine Research at Glenn Research Center, Welch, Jul. 2012.
P&W Propulsion Systems Studies, NASA High Speed Research Workshop, May 14-16, 1991.
Design Optimization of a Variable-Speed Power-Turbine, Hendricks, et al., Jul. 2014.
NASA/CR 2012-217424—Variable-Speed Power-Turbine for the Large Civil Tilt Rotor, Suchezky, Feb. 2012.
Architectural Comparison of Advanced Ultra-High Bypass Ratio Turbofans for Medium to Long Range Application, Bijewitz, 2014. Prior Art Direct Drive Engines.
Energy Efficient Engine High-Pressure Turbine Uncooled Rig Technology Report, NASA CR-16149, Oct. 1981.
Federal Aviation Administration Advisory Circular dated Apr. 13, 2006 on Calibration Test, Endurance Test and Teardown Inspection for Turbine Engine Certification.
Aircraft Engine Design, Second Edition, Jack D. Matingly, pp. 290-292.
Walters, M. H. et al., "Analysis of Turbofan Propulsion System Weight and Dimensions," NASA, TM X-73,199, Jan. 1977.
Jane's Aero-Engines, Issue Seven, Copyright 2000, pp. 510-512.
Int'l Search Report and Written Opinion for corresponding PCT/US2013/022388, dated Dec. 30, 2013.
Kandebo, Stanley, "Geared-Turbofan Engine Design Targets Cost,Complexity," 1998, Aviation Week & Space Technology, vol. 148, Issue 8, start p. 32.
Mattingly, et al., Aircraft Engine Design, 2002, American Institute of Ae3ronautics and Astronautics, 2nd Edition, p. 292.
European Search Report for European Application No. 15199916.6 dated May 12, 2016.
Decision Denying Institution of Inter Partes Review. *General Electric Company., Petitioner*, v. *United Technologies Corp., Patent Owner*. IPR2017-00522. U.S. Pat. No. 8,899,915. Entered Jun. 23, 2017. pp. 1-18.
NASA CR-165608, Energy Efficient Engine,High-Pressure Turbine Detailed Design Report by Robert D. Thulin, et al.
IPR Petition of now U.S. Pat. No. 8,899,915, dated Dec. 21, 2016.
Petition for Inter Partes Review of U.S. Pat. No. 8,899,915. *General Electric Company, Petitioner*, v. *United Technologies Corporation, Patent Owner*. Filed Dec. 21, 2016.
Kurzke, J., Preliminary Design, Aero-Engine Design: From State of the Art Turbofans Towards Innovative Architectures. Mar. 3-7, 2008. pp. 1-72.
Willis, W.S., Quiet Clean Short-Haul Experimental Engine (QCSEE) Final Report. Aug. 1979.
Leckie, F.A. and Dal Bello, D.J. (2009). Strength and stiffness of engineering systems. Mechanical Engineering Series. Springer. pp. 1-3 (improperly identified as Bauchau on IPR Petition (filed on IDS dated Feb. 2016).
Declaration of Raymond Drago. In re U.S. Pat. No. 8,899,915 under 37 C.F.R. § 1.68. Executed Dec. 9, 2016. pp. 1-38.
Thulin, R.D. et al., NASA CR-165608, Energy Efficient Engine, High-Pressure Turbine Detailed Design Report. Jan. 1982.

\* cited by examiner

GAS TURBINE ENGINE WITH HIGH SPEED LOW PRESSURE TURBINE SECTION

CROSS-REFERENCE TO RELATED APPLICATION

This application is a continuation-in-part of U.S. application Ser. No. 13/363,154, filed Jan. 31, 2012.

BACKGROUND OF THE INVENTION

This application relates to a gas turbine engine wherein the low pressure turbine section is rotating at a higher speed and centrifugal pull stress relative to the high pressure turbine section speed and centrifugal pull stress than prior art engines.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section.

Traditionally, on many prior art engines the low pressure turbine section has driven both the low pressure compressor section and a fan directly. As fuel consumption improves with larger fan diameters relative to core diameters it has been the trend in the industry to increase fan diameters. However, as the fan diameter is increased, high fan blade tip speeds may result in a decrease in efficiency due to compressibility effects. Accordingly, the fan speed, and thus the speed of the low pressure compressor section and low pressure turbine section (both of which historically have been coupled to the fan via the low pressure spool), have been a design constraint. More recently, gear reductions have been proposed between the low pressure spool (low pressure compressor section and low pressure turbine section) and the fan.

SUMMARY

In a featured embodiment, a gas turbine engine comprises a fan, a compressor section in fluid communication with the fan, a combustion section in fluid communication with the compressor section, and a turbine section in fluid communication with the combustion section. The turbine section includes a first turbine section and a second turbine section. The first turbine section has a first exit area at a first exit point and rotates at a first speed. The second turbine section has a second exit area at a second exit point and rotates at a second speed, which is higher than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5. A gear reduction is included between the fan and a low spool is driven by the first turbine section such that the fan rotates at a lower speed than the first turbine section.

In another embodiment according to the previous embodiment, a gear ratio of the gear reduction is greater than about 2.3.

In another embodiment according to any of the previous embodiments, the gear ratio is greater than about 2.5.

In another embodiment according to any of the previous embodiments, there is a third turbine section. The first turbine section drives the fan, and the second and third turbine sections each drive a compressor rotor of the compressor section.

In another embodiment according to any of the previous embodiments, the gear reduction is positioned intermediate the fan and a compressor rotor driven by the first turbine section.

In another embodiment according to any of the previous embodiments, the gear reduction is positioned intermediate the first turbine section and a compressor rotor driven by the first turbine section.

These and other features may be best understood from the following drawings and specification.

DETAILED DESCRIPTION

Figure 1:
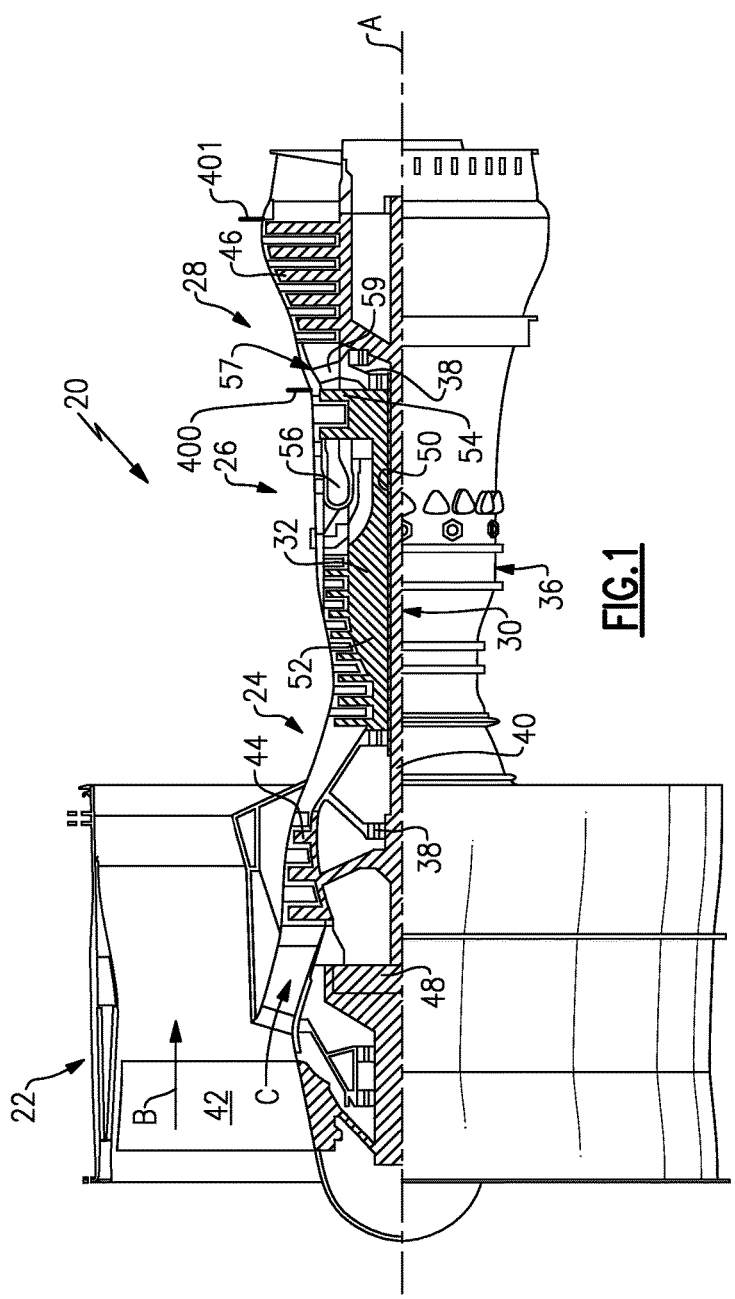
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. In the illustrated example of FIG. 1, the low pressure compressor 44 includes fewer stages than the high pressure compressor 52, and more narrowly, the low pressure compressor 44 includes three (3) stages and the high pressure compressor 52 includes eight (8) stages. A combustor 56 is arranged between the high pressure compressor section 52 and the high pressure turbine section 54. A mid-turbine frame 57 of the engine static structure 36 is arranged generally between the high pressure turbine section 54 and the low pressure turbine section 46. The mid-turbine frame 57 further supports bearing systems 38 in the turbine section 28, which in turn support the inner shaft 40 of low speed spool 30 and the outer shaft 50 of high speed spool 32 as illustrated in FIG. 1. As used herein, the high pressure turbine section experiences higher pressures than the low pressure turbine section. A low pressure turbine section is a section that powers a fan 42. In the illustrated example of FIG. 1, the high pressure turbine 54 includes fewer stages than the low pressure turbine 46, and more narrowly, the low pressure turbine 46 includes five (5) stages, and the high pressure turbine 54 includes two (2) stages. The inner shaft 40 and the outer shaft 50 are concentric and rotate via bearing systems 38 about the engine central longitudinal axis A which is collinear with their longitudinal axes. The high and low spools can be either co-rotating or counter-rotating.

The core airflow C is compressed by the low pressure compressor section 44 then the high pressure compressor section 52, mixed and burned with fuel in the combustor 56, then expanded over the high pressure turbine section 54 and low pressure turbine section 46. The mid-turbine frame 57 includes airfoils 59 which are in the core airflow path. The turbine sections 46, 54 rotationally drive the respective low speed spool 30 and high speed spool 32 in response to the expansion.

The engine 20 in one example is a high-bypass geared aircraft engine. The bypass ratio is the amount of air delivered into bypass path B divided by the amount of air into core path C. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine section 46 has a pressure ratio that is greater than about 5. In one disclosed embodiment, the engine 20 bypass ratio is greater than about ten (10:1), the fan diameter is significantly larger than that of the low pressure compressor section 44, and the low pressure turbine section 46 has a pressure ratio that is greater than about 5:1. In some embodiments, the high pressure turbine section may have two or fewer stages. In contrast, the low pressure turbine section 46, in some embodiments, has between 3 and 6 stages. Further the low pressure turbine section 46 pressure ratio is total pressure measured prior to inlet of low pressure turbine section 46 as related to the total pressure at the outlet of the low pressure turbine section 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC"). TSFC is the industry standard parameter of the rate of lbm of fuel being burned per hour divided by lbf of thrust the engine produces at that flight condition. "Low fan pressure ratio" is the ratio of total pressure across the fan blade alone, before the fan exit guide vanes. The low fan pressure ratio as disclosed herein according to one non-limiting embodiment is less than about 1.45. "Low corrected fan tip speed" is the actual fan tip speed in ft/sec divided by an industry standard temperature correction of [(Ram Air Temperature deg R)/518.7)^0.5]. The "Low corrected fan tip speed" as disclosed herein according to one non-limiting embodiment is less than about 1150 ft/second. Further, the fan 42 may have 26 or fewer blades.

Figure 2:
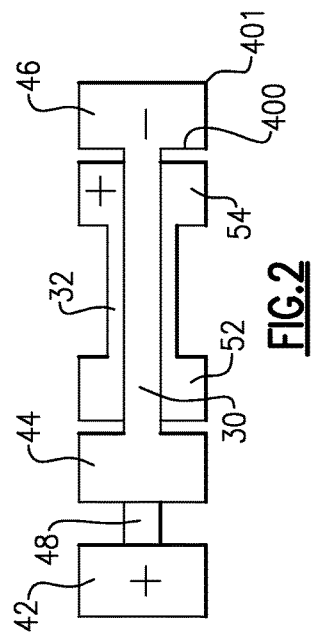
FIG. 2 schematically shows the arrangement of the low and high spool, along with the fan drive.

An exit area 400 is shown, in FIG. 1 and FIG. 2, at the exit location for the high pressure turbine section 54. An exit area for the low pressure turbine section is defined at exit 401 for the low pressure turbine section. As shown in FIG. 2, the turbine engine 20 may be counter-rotating. This means that the low pressure turbine section 46 and low pressure compressor section 44 rotate in one direction, while the high pressure spool 32, including high pressure turbine section 54 and high pressure compressor section 52 rotate in an opposed direction. The gear reduction 48, which may be, for example, an epicyclic transmission (e.g., with a sun, ring, and star gears), is selected such that the fan 42 rotates in the same direction as the high spool 32. With this arrangement, and with the other structure as set forth above, including the various quantities and operational ranges, a very high speed can be provided to the low pressure spool. Low pressure turbine section and high pressure turbine section operation are often evaluated looking at a performance quantity which is the exit area for the turbine section multiplied by its respective speed squared. This performance quantity ("PQ") is defined as:

$$PQ_{ltp}=(A_{lpt} \times V_{lpt}^2) \quad \text{Equation 1}$$

$$PQ_{hpt}=(A_{hpt} \times V_{hpt}^2) \quad \text{Equation 2}$$

where $A_{lpt}$ is the area of the low pressure turbine section at the exit thereof (e.g., at 401), where $V_{lpt}$ is the speed of the low pressure turbine section, where $A_{hpt}$ is the area of the high pressure turbine section at the exit thereof (e.g., at 400), and where $V_{hpt}$ is the speed of the low pressure turbine section. As known, one would evaluate this performance quantity at the redline speed for each turbine section Thus, a ratio of the performance quantity for the low pressure turbine section compared to the performance quantify for the high pressure turbine section is:

$$(A_{lpt} \times V_{lpt}^2)/(A_{hpt} \times V_{hpt}^2)=PQ_{ltp}/PQ_{hpt} \quad \text{Equation 3}$$

In one turbine embodiment made according to the above design, the areas of the low and high pressure turbine sections are 557.9 in² and 90.67 in², respectively. Further, the redline speeds of the low and high pressure turbine sections are 10179 rpm and 24346 rpm, respectively. Thus, using Equations 1 and 2 above, the performance quantities for the low and high pressure turbine sections are:

$$PQ_{ltp}=(A_{lpt} \times V_{lpt}^2)=(557.9 \text{ in}^2)(10179 \text{ rpm})^2=57805157673.9 \text{ in}^2 \text{ rpm}^2 \quad \text{Equation 1}$$

$$PQ_{hpt}=(A_{hpt} \times V_{hpt}^2)=(90.67 \text{ in}^2)(24346 \text{ rpm})^2=53742622009.72 \text{ in}^2 \text{ rpm}^2 \quad \text{Equation 2}$$

and using Equation 3 above, the ratio for the low pressure turbine section to the high pressure turbine section is:

$$\text{Ratio}=PQ_{ltp}/PQ_{hpt}=57805157673.9 \text{ in}^2 \text{ rpm}^2/53742622009.72 \text{ in}^2 \text{ rpm}^2=1.075$$

In another embodiment, the ratio was about 0.5 and in another embodiment the ratio was about 1.5. With $PQ_{ltp}/PQ_{hpt}$ ratios in the 0.5 to 1.5 range, a very efficient overall gas turbine engine is achieved. More narrowly, $PQ_{ltp}/PQ_{hpt}$ ratios of above or equal to about 0.8 are more efficient. Even more narrowly, $PQ_{ltp}/PQ_{hpt}$ ratios above or equal to 1.0 are even more efficient. As a result of these $PQ_{ltp}/PQ_{hpt}$ ratios, in particular, the turbine section can be made much smaller than in the prior art, both in diameter and axial length. In addition, the efficiency of the overall engine is greatly increased.

The low pressure compressor section is also improved with this arrangement, and behaves more like a high pressure compressor section than a traditional low pressure compressor section. It is more efficient than the prior art, and can provide more work in fewer stages. The low pressure compressor section may be made smaller in radius and shorter in length while contributing more toward achieving the overall pressure ratio design target of the engine.

Figure 3:
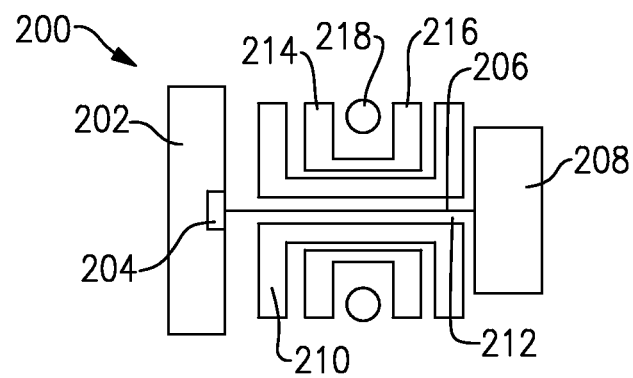
FIG. 3 shows another embodiment.

FIG. 3 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 4:
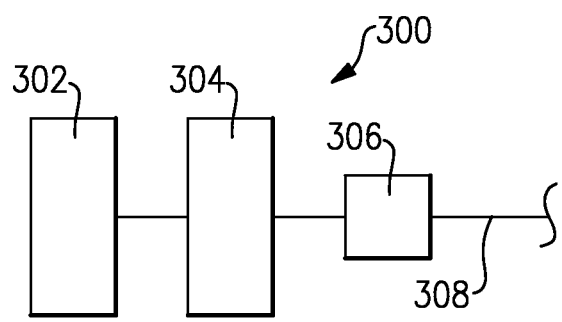
FIG. 4 shows yet another embodiment.

FIG. 4 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The FIG. 5 or 6 engines may be utilized with the features disclosed above.

While this invention has been disclosed with reference to one embodiment, it should be understood that certain modifications would come within the scope of this invention. For that reason, the following claims should be studied to determine the true scope and content of this invention.

The invention claimed is:

1. A gas turbine engine comprising:
a fan;
a compressor section in fluid communication with the fan;
a combustion section in fluid communication with the compressor section;
a turbine section in fluid communication with the combustion section,
wherein the turbine section includes a first turbine section and a second turbine section,
wherein said first turbine section has a first exit area at a first exit point and is configured to rotate at or below a first speed,
wherein said second turbine section has a second exit area at a second exit point and is configured to rotate at or below a second speed, which is higher than the first speed, said first and second speeds being redline speeds,
wherein a first performance quantity is defined as the product of the first speed squared and the first area,
wherein a second performance quantity is defined as the product of the second speed squared and the second area;
wherein a ratio of the first performance quantity to the second performance quantity is between 0.5 and 1.5; and
a gear reduction is included between said fan and a low spool driven by the first turbine section such that the fan rotates at a lower speed than the first turbine section.

2. The gas turbine engine as set forth in claim 1, wherein there is a third turbine section, the first turbine section driving the fan, and the second and third turbine sections each driving a compressor rotor of the compressor section.

3. The gas turbine engine as set forth in claim 1, wherein the gear reduction is positioned intermediate the fan and a compressor rotor driven by the first turbine section.

4. The gas turbine engine as set forth in claim 1, wherein the gear reduction is positioned intermediate the first turbine section and a compressor rotor driven by the first turbine section.

5. The gas turbine engine as set forth in claim 1, wherein the ratio is above or equal to 0.8.

6. The gas turbine engine as set forth in claim 1, comprising a mid-turbine frame positioned intermediate the first and second turbine sections, the mid-turbine frame having a first bearing and a second bearing, the first bearing supporting a first shaft coupled to the first turbine section, and the second bearing supporting a second shaft coupled to the second turbine section.

7. The gas turbine engine as set forth in claim 6, wherein the first and second bearings are situated between the first exit area and the second exit area.

8. The gas turbine engine as set forth in claim 7, wherein:
the first turbine section has between three and six stages;
the second turbine section has two or fewer stages; and
the fan defines a pressure ratio less than 1.45.

9. The gas turbine engine as set forth in claim 1, wherein the compressor section includes a first compressor section upstream of a second compressor section, the first compressor section including fewer stages than the second compressor section.

10. The gas turbine engine as set forth in claim 1, wherein each of first turbine section and the second turbine section is configured to rotate in a first direction.

11. The gas turbine engine as set forth in claim 1, wherein the ratio is above or equal to 1.0.

12. A gas turbine engine comprising:
a compressor section in fluid communication with a fan;
a turbine section in fluid communication with the compressor section, the turbine section including a first turbine section and a second turbine section,
wherein said first turbine section has a first exit area at a first exit point and is configured to rotate at a first speed, and said second turbine section has a second exit area at a second exit point and is configured to rotate at a second speed, which is higher than the first speed, said first and second speeds being redline speeds,
wherein a first performance quantity is defined as the product of the first speed squared and the first area, a second performance quantity is defined as the product of the second speed squared and the second area, and a ratio of the first performance quantity to the second performance quantity is less than or equal to 1.5; and
a gear reduction situated between the fan and a low spool driven by the first turbine section such that the fan rotates at a lower speed than the first turbine section.

13. The gas turbine engine as set forth in claim 12, wherein the ratio is above or equal to 1.0.

14. The gas turbine engine as set forth in claim 12, wherein the ratio is above or equal to 0.5.

15. The gas turbine engine as set forth in claim 12, wherein the ratio is above or equal to 0.8.

16. The gas turbine engine of claim 12, comprising a mid-turbine frame positioned intermediate the first turbine section and the second turbine section, the mid-turbine frame having a first bearing and a second bearing, the first bearing supporting a first shaft coupled to the first turbine section, and the second bearing supporting a second shaft coupled to the second turbine section.

17. The gas turbine engine as set forth in claim 16, wherein the first and second bearings are situated between the first exit area and the second exit area.

18. A method of designing a gas turbine engine, comprising:
   providing a fan;
   providing a compressor section in fluid communication with said fan, said compressor section including a first compressor section and a second compressor section;
   providing a turbine section, including both a first turbine section and a second turbine section, said turbine section supported by a first bearing and a second bearing both in a mid-turbine frame,
   wherein said first turbine section has a first exit area at a first exit point and is configured to rotate at a first speed, and said second turbine section has a second exit area at a second exit point and is configured to rotate at a second speed, which is higher than the first speed, said first and second speeds being redline speeds,
   wherein a first performance quantity is defined as the product of the first speed squared and the first area at a predetermined design target, a second performance quantity is defined as the product of the second speed squared and the second area at the predetermined design target, and a ratio of the first performance quantity to the second performance quantity is between 1.0 and 1.5; and
   providing a gear reduction situated between said fan and a low spool driven by said first turbine section such that said fan rotates at a lower speed than said first turbine section.

19. The method as set forth in claim 18, wherein said first bearing supports said low spool, and said second bearing supports a high spool driven by said second turbine section.

20. The method as set forth in claim 18, wherein said first and second bearings are situated between said first exit area and said second exit area.

21. The method as set forth in claim 18, wherein:
   said first compressor section includes fewer stages than said second compressor section, said first compressor section being upstream of said second compressor section;
   said first turbine section includes between three (3) and six (6) stages; and
   said second turbine section includes two or fewer stages.

* * * * *